United States Patent [19]
Shields, Jr. et al.

[11] Patent Number: 6,156,355
[45] Date of Patent: Dec. 5, 2000

[54] BREED-SPECIFIC CANINE FOOD FORMULATIONS

[75] Inventors: Richard G. Shields, Jr., Newport, Ky.; Jeffrey P. Bennett, Corona, Calif.

[73] Assignee: Star-Kist Foods, Inc., Newport, Ky.

[21] Appl. No.: 09/245,067

[22] Filed: Feb. 5, 1999

Related U.S. Application Data

[60] Provisional application No. 60/107,033, Nov. 2, 1998.

[51] Int. Cl.$^7$ .................................................. A23K 1/175
[52] U.S. Cl. .............................. 426/74; 426/61; 426/805; 426/650
[58] Field of Search ............................... 426/74, 61, 805, 426/650

[56] References Cited

U.S. PATENT DOCUMENTS

| | | | |
|---|---|---|---|
| 5,851,573 | 12/1998 | Lepine et al. | 426/74 |
| 5,968,569 | 10/1999 | Cavadivi et al. | 426/61 |

OTHER PUBLICATIONS

Product alert; Mar. 9, 1998.
Global Speciality Pet Food, Website: www.bestbreed.com last update: Oct. 9, 1999, 1996.
Groom and Board, vol. 20(1), pp. 11–15, Jan./Feb., 1998.
Pet's First Products, Website: pets1st.com, 1995.
Sensible Choice®, website: www.sensiblechoice.com, 1996.
Canine Caviar, website: www.caninecaviar.com, 1997.

*Primary Examiner*—Chhaya D. Sayala
*Attorney, Agent, or Firm*—Burns, Doane, Swecker & Mathis, L.L.P.

[57] ABSTRACT

Breed-specific dog food formulations that comprise chicken meat as the major ingredient, rice as the predominant (or sole) grain source, fruit and/or vegetable fiber as the primary or sole fiber source, unique fat and antioxidant blend, vitamins, herbs and spices, carotenoids, and no corn or artificial colors, preservatives, flavors or sugars are provided.

7 Claims, No Drawings

BREED-SPECIFIC CANINE FOOD FORMULATIONS

RELATED APPLICATIONS

This application claims benefit of priority to provisional application Serial No. 60/107,033, filed Nov. 2, 1998, the contents of which are incorporated by reference in their entirety herein.

FIELD OF THE INVENTION

This invention is related to pet food formulations designed based on the unique characteristics of different breeds.

BACKGROUND OF THE INVENTION

A wide variety of different dog food formulations of the wet and dry type are commercially available, e.g., from grocery, pet specialty and veterinary sources. Typically, such dog food formulations are generic in that they are designed to be consumed by any breed. However, some dog food formulations are specialized at least to the extent that they are preferably consumed by dogs of different ages, e.g, puppy, adult and geriatric dog formulations are widely available. Typically, such formulations differ in their caloric, protein, and fat content. Also, dog food formulations adapted for obese dogs are prevalent in the industry. Such dog food formulations, as might be expected, typically have a lower caloric content and higher fiber content relative to other dog food formulations.

In fact, there are many excellent premium pet foods in the marketplace which address the nutritional needs of pets from different perspectives. A good example of pet food formulations that address nutritional needs based on specific age are the Nature's Recipe Original® products. These diets address specific nutrient needs during an individual life stage. These diet lines differ widely with respect to the true differences among life stages. Because of the wide differences in rate at which breeds mature and absolute life-span differences, determination of the appropriate time to switch diets can be quite difficult. Other products address different energy requirements among pets, some of which may have a genetic component. The Puppy/Performance/-Lactation, Maintenance and Senior/Pension Lamb Meal & Rice Formulations incorporate a range of dietary energy levels as wide as any in the industry.

An additional segment of the pet food market incorporates differences in ingredient usage or product form. These fill the needs of some pet owners for taste and variety. Nature's Recipe® diets are well-represented in this segment as well since diets are formulated using a single meat protein source, allowing for true ingredient diversity. Many other product lines are fairly similar in ingredient selection with only minor differences in formulations. Relative to product form, Nature's Recipe Original® includes a complementary line of dry and canned products. Additionally, within canned products they offer a choice of ground or formed (carved) products.

A final segment of the pet food market which has been recently introduced involves formulations for specific breeds and/or adult weight. The Nature's Recipe® Group Specific Formulas excel in this category as they consider differences in nutrient requirements and physical form (size and mouth configuration) among breeds.

Such formulations have been developed in part because canine breeds differ from each other both on the outside and the inside. These differences include some of the more obvious things, including size at maturity, mouth and body dimensions. They also differ with respect to how fast they reach their mature weight. Some breeds, such as the Miniature Dachshund, reach mature body weight at approximately eight months of age while the Newfoundland takes over two years. This makes a huge difference in the physiological maturity of the dam at breeding age.

Although not marked, differences do exist in the digestibility of nutrients among breeds. While no comprehensive research for all breeds have been done, some research conducted by the present inventors has suggested that Toy Fox Terriers had a lower digestibility coefficient for the same diet than for the Beagle or Brittany, and that daily energy requirements to maintain body weight are lower for Miniature Poodles and higher for German Shorthairs and Coonhounds than the other breeds at our kennel. The latter likely resulted from the activity level of these breeds as they were quite active. On the same note, some breeds, such as Labrador Retrievers, Basset Hounds, Beagles, Cocker Spaniels, and several in the Terrier group, appear to be predisposed to obesity.

Finally, the ingredient tolerance and nutrient metabolism differ among breeds. This may result in different "normal" blood measurements. Published research has documented that, at least during the reproductive cycle, the Brittany has inherently lower levels of some standard blood measurements than the Beagle or Labrador Retriever. Some of these differences result from efficiencies of various enzyme systems in the body while others are the result of actual genetic abnormalities which accumulate over generations of breeding.

There have been 350–400 genetic disorders identified in dogs, compared to approximately 3,200 in humans. These disorders have been identified in approximately seventy percent of the recognized breeds and the prevalence in all dogs is thought to be approximately twenty-five percent. These genetic difficulties include anatomical malformations, errors of metabolism and genetic predispositions to conditions including cancer, bleeding disorders, and drug reaction. Often times the problem is an enzyme deficiency or defect in a specific structural protein in the body. This, in turn, results in a deficiency of some compound required by the body, a build-up of a compound at unusually high levels, or adaptation of metabolic pathways in the body to compensate for the problem. In the latter situation, clinical signs may not be evidenced or may only manifest themselves at times of high nutrient need. Some genetic defects are lethal either to the developing fetus or early in life, while others are not life-threatening.

Many of these conditions are inherited recessively and do not show up until two dogs which are carriers are bred. Unfortunately, screening tests are not available for many conditions and breeders often find out about problems only after a stud dog has been bred to numerous females. A carrier with an excellent show record can, therefore, spread the gene rapidly. It has been estimated that a single stud dog could represent five to ten percent of the entire genetic make-up of some rare breeds. Inbreeding per se is not necessarily the cause of expression of genetic problems but does expose them more readily. All biological organisms accumulate mutations over time and those which have fatal consequences become self limiting. Moreover, genetic defects are not exclusive to purebreds. It has been estimated that mixed breed dogs have 102 known defects, which is greater than many purebred breeds with a high incidence such as Cairn Terriers (37) and Cocker Spaniels (52). The reason for this is that many breeds have common genetic defects.

As indicated above, many healthy humans have genetic defects which force them to consume special diets. Any person who drinks a diet cola will find the phrase "phenylketonurics: contains phenylalanine" because some people have an inability to metabolize this amino acid (protein building block) so they should try to limit consumption. Another well known condition is lactose intolerance (inability to digest and utilize milk sugar) present in humans, especially those of Asian, Southern European, or African decent. The lack of persistence of the ability to digest milk after weaning is carried as a recessive gene. This situation is easily handled by avoidance of milk or consumption of enzymes which assist this digestion. A minority of the population in unable to regulate cholesterol synthesis in response to dietary intake, but it seems to be a dietary consideration in all of us. Incidence of most of the chronic diseases which occur in the geriatric population, including degenerative joint disease, heart disease, liver disease and diabetes also likely have genetic components.

Thus, pets, similar to humans, exhibit significant genetic diversity which affects their overall health and nutritional requirements. Therefore, notwithstanding the many different types of pet food formulations, and more specifically dog food formulations commercially available, there still exists a prevalent need for improved formulations that take into account the significant genetic differences between different breeds.

OBJECTS OF THE INVENTION

Accordingly, it is an object of the invention to provide improved dog food formulations designed for specific breeds that are designed based on the genetic diversity of different dog breeds.

More specifically, it is an object of the invention to provide dog food formulations that are designed taking into account the different food allergies of different dog breeds.

Still more specifically, it is an object of the invention to provide dog food formulations that comprise the following unique combination of ingredients and features:

(i) chicken meat and/or meal as the primary ingredient (and only meat source);
(ii) rice as the primary grain source;
(iii) unique antioxidant blend;
(iv) unique fat blend
(v) organic minerals;
(vi) unique fiber blend;
(vii) specific combinations of herbs and species;
(viii) no added artificial colors or preservatives, flavors or sugars; and
(ix) nutrition substantiation through AAFCO feeding studies.

More specifically, it is an object of the invention to provide pet food formulations having the above ingredients and features wherein:

(1) the total digestibility ranges from 85–90%;
(2) there are no meat products other than chicken meat and/or meal;
(3) it lacks any corn;
(4) it comprises a blend of vitamins including tocopherols, vitamin C (ascorbic acid), minerals (copper, zinc and iron in inorganic and organic complex form), carotenoids (e.g., beta carotene and lutein), and herbs (including rosemary);
(5) a fat blend including canola oil, salmon oil and evening primrose oil;
(6) fruit and/or vegetable fiber rather than grains, such as tomato pomace, as the primary fiber source.
(7) herbs and spices including spearmint, ginger, ginseng, ginkgo, parsley and *Yucca schidigera* extract; and
(8) kibble size, shape, feed recommendations tailored to specific breed.

Still more specifically, it is an object of the invention to provide a dog food formulation specially designed for sporting dogs. In particular, formulations designed for sporting dogs will comprise rice, no gluten-containing grains, taurine, Vitamin E, selenium, and herbs, and are fortified with sodium bicarbonate and minerals, such as calcium, and organic compounds such as glucosamine. Also, this formulation has higher percentage of fat calories and energy relative to other breed formulations. This diet is made in a unique triangle shape which resembles the mouth dimensions of breeds in this group.

It is another more specific object of the invention to provide a dog food formulation that comprises the foregoing ingredients and features which is specifically designed for working dogs that contains a high percentage of fat, higher vitamin and mineral fortification, and which is fortified with a number of antioxidants, choline, garlic, Hawthorn berry powder, and taurine, and minerals including calcium, and organic compounds such as glucosamine, potassium citrate, and sodium.

It is still another specific object of the invention to provide dog food formulations that comprises the foregoing general ingredients and features that are specifically adapted for non-sporting dogs. Such formulations will comprise, in particular, sodium hexametaphosphate, and significant amounts of Vitamin A, B Vitamins, and minerals such as copper and zinc.

It is yet another object of the invention to provide a dog food formulations that comprise the foregoing general ingredients and features that are specifically designed for herding dogs. The herding dog formulations comprise higher vitamin and mineral supplements, such as calcium, potassium citrate, and sodium, and organic compounds such as glucosamine, and additionally comprise oat and barley fiber, direct-fed microbials (DFM), and bromelain (to aid digestion).

It is still another object of the invention to provide dog food formulations that comprise the foregoing general ingredients and features which are specifically designed for Terrier dogs. These formulations comprise higher protein and immediate fat content, lower copper and higher zinc, garlic and milk thistle powder.

It is another specific object of the invention to provide dog food formulations comprising the above features and ingredients that are designed for Toy breeds. These formulations further comprise sodium bicarbonate and potassium chloride, garlic powder, cranberry powder, niacin, B-vitamins, yeast, and have a small kibble size because of the small size of Toy breeds.

It is another object of the invention to provide dog food formulations which additionally comprise the foregoing general ingredients and features that are specifically designed for hounds. These formulations comprise higher vitamin and mineral levels, glutamine, oat and barley fiber, direct-fed microbials (DFM), garlic and cranberry juice powder.

DETAILED DESCRIPTION OF THE INVENTION

The breed-specific dog formulations of this invention were originally developed because of a recognized food sensitivity observed in different types of dogs which undoubtedly had a genetic component. Numerous well-recognized problems exist in individual breeds, including a Vitamin A responsive dermatitis in Cocker Spaniels and zinc-responsive dermatitis in Siberian Huskies and Alaskan Malamutes. An additional example is the presence of a gluten intolerance in Irish Setters which closely resembles celiac disease in humans and manifests itself as weight loss and chronic, intermittent diarrhea. German Shepherds and Beagles, on the other hand, appear to experience diarrhea caused by a gastrointestinal immune deficiency. Hip dysplasia has been identified in over 100 breeds including several in the Herding, Working and Sporting group. The cause of this condition is likely multifactorial in nature, but dietary management may play a role in expression of the condition. Some Cocker Spaniels and Golden Retrievers appear to have low blood taurine levels which are responsive to dietary taurine supplementation, similar to the cat. Dalmatians are recognized as having predisposition to deafness and presence of uric acid crystals in the urine. Several breeds within the Working Group, including Boxers, Doberman Pinschers, and Great Danes, can develop a heart condition called cardiomyopathy. Bedlington Terriers and West Highland Terriers can experience a copper storage disease. Poodles have been recognized as having somewhat of a predisposition toward periodontal disease.

The pet food formulations of this invention, which are commercially available under the tradename Nature's Recipe Group Specific Formulas® are designed to meet the unique needs of pets within various breed groups. They share many common characteristics which make them excellent choices for any pet and some unique characteristics which may add additional value for specific breed groups.
Common Features of Feed Formulations of the Invention The novel breed-specific dog food formulations of the invention now being sold under the name Nature's Recipe Group Specific Formulas® contain many common features which collectively make them unique both from previously available Nature's Recipe® products and other pet food formulations. These include:

Chicken meat as the number one ingredient—15–30%, preferred 20–25%.

Rice as the primary grain source—20 to 45%.

Unique antioxidant blend—Tocopherols (0.025 to 0.05%), Vitamin C, beta carotene, lutein (from marigold extract), lycoper (from tomato pomace), and rosemary, ginkgo and ginseng Organic minerals—0.1 to 0.2%

Unique fiber blend—0.5 to 4%

Herbs and Spices—0.05 to 0.2%

No added artificial colors, preservatives, flavors or sugars

Nutrition substantiation through AAFCO feeding studies.

The combination of chicken meat, quality grains, such as rice, and herbs and spices, assures unique taste and nutrition. Total digestibility of these formulations ranges from 85–90%, well above those of competitive pet food products. Preferably, the crude protein of the subject formulations will range from about 20 to 30% minimum, more preferably about 22 to 26% minimum.

Free radicals which form upon exposure to the environment or during normal metabolism can be harmful to cell membranes, proteins and genetic material which can have adverse consequences on the quality of the food and to the body as well. Accordingly, the subject formulations comprise a balanced blend of antioxidants with respect to solubility (fat or water soluble), stage of rancidity in which they act (oxygen scavengers, free radical termination), and tissues in which they concentrate in the body. Additionally, some antioxidants are complementary and others antagonistic to one another, so balance of these antioxidants is crucial. Accordingly, the subject formulations have been designed to incorporate a blend of vitamins (tocopherols, Vitamin C (ascorbic acid), minerals (copper, zinc and iron in both inorganic and organic complex form), carotenoids (such as beta carotene and lutein from marigold extract) and herbs (including rosemary), to perform this very important function.

Moreover, the formulations of the invention comprise a unique fat blend which includes canola oil, salmon oil, and evening primrose oil to complement the excellent fat quality of the chicken fat. Canola oil and salmon oil are used as sources of short and long-chain omega-3 fatty acids, while evening primrose oil provides an omega-6 fatty acid called gamma linolenic acid (GLA). The latter two fat sources bypass the need for some key enzymes required in fatty acid metabolism. The present inventors hypothesize that both the ratio of omega-6 to omega-3 fatty acids and the absolute quantities of individual representative compounds is significant to the nutritional requirements of dogs.

Preferably, the minimum amount of canola oil will range from 1 to 5.0 percent, the minimum amount of salmon oil from 0.1 to 0.6 percent, and the minimum amount of evening primrose oil from .0.1 to .0.4 percent. Amount will vary depending on the dietary fat content to maintain levels and ratios of fatty acid groups.

Also, the subject formulations comprise a blend of inorganic minerals and mineral proteinates. The latter form may improve vitamin (and therefore antioxidant) stability since some minerals, such as copper and iron, are pro-oxidants. Because they are metabolized differently than inorganic minerals their availability is also generally higher so the body rather than the stool benefits from the minerals in the diet. Examples thereof include zinc oxide, zinc proteinate, ferrous sulfate, iron proteinate, manganous oxide, copper sulfate, copper proteinate, calcium iodate, sodium selenite, and potassium citrate.

Also, in Nature's Recipe products, fruit and/or vegetable fiber (e.g., tomato pomace) is incorporated as a primary fiber source to maintain normal gastrointestinal function. This is a high quality, moderately fermented fiber in contrast to grain fibers which are more slowly fermented. Additionally, in the Group Specific Formulas, chicory root extract is added which serves as a source of soluble fiber. This material, a source of inulin, has been reported in both humans and pets to promote the growth of beneficial bacteria. Generally, the amounts thereof are sufficient to provide a crude fiber content ranging from 0.5 to 10%, more preferably about 2 to 4% maximum.

Several herbs and spices which are widely used as supplements for humans and pets are added to the subject pet food formulations, including spearmint, ginger, ginseng, ginkgo, parsley, and *Yucca schidigera* extract. These ingredients contribute to the unique aroma and taste of the pet food formulations of the invention. Other herbs and plant materials that may be included comprise milk thistle powder, marigold extract, rosemary, chicory, and cranberry juice extract.

Also, the subject pet food formulations are naturally preserved and are free of added artificial colors and flavors. Chicken is the only meat protein source used and no corn is used in these formulations.

The subject pet food formulations are also designed taking into account feeding studies to ensure nutritional adequacy. The subject pet food formulations, when properly used, should also satisfy the nutrient ranges established in the AAFCO Nutrient Profiles. This should provide the ultimate assurance of nutritional quality.

Thus, the subject formulations sold under the Nature's Recipe Group Specific Formulas® collectively share some novel ingredients which make them unique relative to competitive products. This includes the use of chicken meat as the primary ingredient, and the only meat-derived material, the use of a more complete antioxidant blend including vitamins, carotenoids, spices and herbs, a unique blend of fats and oils including canola oil, salmon oil and primrose oil, the use of mineral proteinates, a unique fiber blend including tomato pomace and chicory extract, and inclusion of several herbs which are commonly consumed by humans for wellness reasons. The combination of these features provides a formula of both outstanding palatability, digestibility and potential wellness support. The utilization of these diets by the pet exceeds that of any dry diet ever tested at our research facility.

In addition to the common features listed above, the subject breed-specific formulations contain other unique features. These differences include the kibble size and shape, the feeding recommendations, the bag sizes offered (to maintain product freshness), as well as the ingredients and nutrient levels. The variety of shapes and sizes includes a triangle Sporting Diet, square Terrier Diet, rectangular Non-Sporting Diet, almond shaped Hound Diet and round Toy, Working and Herding Diets in variable diameter and thickness appropriate for their sizes.

Specifically, each diet is uniquely different as well with respect to specific nutrient targets (both nutrients listed in the standard AAFCO Nutrient Profile and some potential conditionally essential nutrients which may be of benefit in specific animals), ingredients excluded to prevent intolerances (protein sources and food additives) and functional ingredients. These adjustments have been made because the size and shape outside and metabolism inside differs among breed groups or at least among some lines within these groups. The size and shape of the kibbles were selected based on the range of sizes and mouth configurations within a group in an attempt to encourage consumption. This may help to explain why the diets appear to perform even better in homes where the animal-diet relationship is in harmony compared to a research palatability panel with animals of multiple groups. Feeding directions are also modified both with respect to puppy feeding levels which are restricted in breed groups susceptible to bone and joint abnormalities and for adults in breeds predisposed to obesity. Also, additional choline is added which may reduce carnitine excretion.

Each of the diets incorporates the latest in nutrition and wellness technology. Because these diets are preventative rather than therapeutic in nature and complete with respect to nutrition, there is little harm if animals are not fed the recommended diet. With the common benefits present in these diets, each of these diets provide unsurpassed nutritional delivery compared to competitive products even if the added benefit of breed adjustment is ignored. With this general understanding of the invention, more specific embodiments are described below.

Unique Features of the Sporting Diet Formulation

The Sporting formula contains the highest energy level per cup and the highest percentage of fat calories among the subject breed-specific formulations because of the calorie demands of exercise. Vitamin and mineral fortification as well as choline is also higher in this diet to aid in the processing of nutrients into energy as well as to provide electrolytes. The level of rice in this formula is also higher to support superior digestibility. Exercise increases the generation of free radicals which may be detrimental to the body, so this diet is well fortified with a wide array of antioxidants. The diet is supplemented with sodium bicarbonate (baking soda) to adjust the mineral balance of the diet. This Supplement is widely used in racing horse diets.

Some Irish Setters have been recognized to exhibit an intolerance to gluten which resembles celiac disease in humans. This problem is still not completely understood but thought to result from an intestinal permeability defect in these animals. It is generally handled by avoidance of gluten-containing grains, especially wheat. Barley, rye and oats contain lower levels of gluten and are tolerated by some humans having this condition. However, in the interest of caution, rice is the only grain included in the sporting dog formulation.

Another interesting condition occurs in Cocker Spaniels and likely some Golden Retrievers which have low blood taurine levels that may respond to dietary supplementation. This nutrient is typically added to cat diets but responses in dogs have been unrecognized until recently. It is possible that this nutrient may be of benefit in other breeds as well but research has been limited to this point. The reason for the difference in normal blood levels among breeds is not well known. Several other nutrients/ingredients which act as antioxidant sources are also added including vitamins (such as vitamins E and C), carotenoids, minerals (such as selenium), and herbs (such as rosemary).

Garlic, hawthorn berry powder (for antioxidant activity and cardiac tonicity) and glutamine are also added to this product.

Finally, bone and joint problems have been identified in some of the Sporting breeds, including the Brittany, Irish Setter, Cocker Spaniel and Labrador Retriever. Since the latter two breeds can suffer from obesity as well as adults, feeding reductions of 15% (relative to other breeds) have been recommended for these two breeds. This may have added benefit for bone and joint problems. Additionally, puppy feeding directions are reduced by a similar amount relative to standard for all breeds within this group for similar reasons. Nutrients necessary for bone and joint health including zinc, copper, and vitamin C are added in appropriate amounts and our unique blend of fats and *Yucca schidigera* extract to help manage joint inflammation. Mineral balance is also carefully controlled and glucosamine added.

Based on the foregoing, this formulation represents the most tailored Group-Specific Formula with respect to nutrient diversity, digestibility and incorporation of unique ingredients.

Unique Features of the Working Diet

The Working formulation of the invention contains a high percentage of fat calories to support the calorie demands of exercise. Vitamin and mineral fortification is also higher in this diet to aid in the processing of nutrients into energy as well as to provide electrolytes. The formula comprises a high level of rice to support the high digestibility of this diet. Exercise increases the generation of free radicals which may be detrimental to the body, so this diet is well fortified with a wide array of antioxidants. Choline is also supplemented to aid in fat transport and metabolism. Garlic, hawthorn berry powder and taurine are also added to this product.

An added consideration in the Working diet is maintenance of proper body condition to help manage the additional stress on the skeletal structure. Puppy feeding directions for the entire group have been reduced by 15%

(compared to previous Nature's Recipe feeding directions) to reduce weight gain during growth. Feeding management should also be monitored during the adult period as this is a high energy diet. This also reduces the daily delivery of calcium by a similar extent which may be beneficial for some large breed dogs such as Great Danes which are unable to manage excesses of dietary calcium. No salt is added to manage dietary sodium to the extent possible and dietary acid-base balance is managed with potassium citrate to manage calcium mobilization from bone since meat-based diets and growth itself provide an acid load to the body. Glucosamine is also added for the same reasons as the Herding formulation.

The Working formula represents an excellent choice for Working dogs as well as any breed exposed to moderate stress or exercise level. The diet contains additional beta glucoma fiber from oats and barley. A lot of time and attention went into the development of this diet since the inventors have extensive personal experience in raising and showing breeds in this group.

The Working formula has a generous energy allowance and high digestibility to accommodate the energy needs of this group. As with all Group Specific Formulas, digestibility is quite high. Vitamin and mineral supplementation is also higher in this group to allow it to use this energy.

The Working diet is also managed to the extent possible through dietary means to promote proper cardiovascular function. Dilated cardiomyopathy has been noted in Dobermans, Great Danes and Boxers as well as many other species. In this condition the left ventricle is extremely thin and a heart murmur is identified. The form present in Boxers is different from that in the other breeds listed above. In some animals of this breed, carnitine, a natural compound of the body which promotes fat transfer in the body, has been found to be of benefit in delaying mortality from this condition. Therefore, choline is supplemented to all the Group Specific Formulas to help reduce carnitine excretion from the body. The building blocks of this compound are also supplemented. The managed sodium level present for promotion of bone and joint function may also be of benefit in heart health, and with the level of sodium in meat products, salt addition should be unnecessary. Hawthorn berry powder is also added to this diet. They contain a mixture of bioflavonoids which have antioxidant activity and may reduce blood pressure, Potassium supplemental as is done in this formula may also have modest benefits in this regard.

The antioxidants present in all of the diets including vitamins, minerals, carotenoids, spices and herbs as well as the omega 3 and GLA oils added to these diets for inflammation management should also assist in prevention of problems.

Many antioxidant nutrients have been found to be of some benefits in cardiomyopathies of different species, including selenium, a mineral, in livestock and taurine, an amino acid-like compound in cats and some dog breeds such as Cocker spaniels and Golden Retrievers. As a precaution, the Working diet is supplemented with both selenium and taurine as extensive research has not been conducted in all breed groups and the nutrients will do no harm at the level of supplementation utilized.

Unique Features of the Non-sporting Diet

The Non-Sporting formula is highly digestible but contains a managed level of protein and fat calories. These characteristics make this diet an excellent choice for mixed breed dogs, for spayed and neutered pets or for pet owners desiring to control protein and fat calories. The mineral balance is adjusted by the use of sodium hexametaphosphate. In fact, the Non-Sporting formula, because of its high energy level, without excessive use of protein or fat, serves as an excellent all-purpose diet both for Non-Sporting and mixed breed dogs.

The Non-Sporting group probably has as wide a diversity of pet types as any group. The diet designed for them is a moderate protein, moderate calorie diet which serves as our recommendation for mixed breed dogs of normal activity. For those engaged in extreme activity, the Sporting formula would then be recommended.

The most well-recognized problem of this group which is diet responsive is urate crystals in Dalmatians. Because of the extreme dietary adjustments required for this breed, we generally consider this condition to be a candidate for a veterinary medical diet. In fact, many pets of this breed have been fed Nature's Recipe Vegetarian Canine Formula as it has several attributes thought to be beneficial for prevention of this condition. This breed was not ignored in the dietary formulation of the Non-Sporting formula, however. The total protein level in this formula is managed because it is this nutrient group which is ultimately the source of uric acid. Additionally, the meat protein source is meat muscle tissue rather than meat by-products since the latter is higher in nucleic acids.

As stated previously, the Vegetarian Formula would be better still in this respect. Additionally, this condition is best addressed in a more alkaline urine and the Non-Sporting formula, because of the specific mineral balance associated with ingredients such as sodium hexametaphosphate, should promote a more alkaline diet than any of the other Group Specific Formulas. Although certainly not proven scientifically, chicory root has been used in humans for gout to increase uric acid excretion, likely resulting on its effects on the liver or as a diuretic in the kidney.

Skin and hair coat problems have been noted in several breeds including the Chinese Shar Pei, the Chow Chow and the Miniature Poodle. This problem is also accounted for in the subject breed-specific formulations. In addition to a generous supply of vitamins (B-vitamins, vitamin A) and minerals (zinc and copper in proteinate form which is more available for deposition in hair), the Group Specific Formulas incorporate the latest in fatty acid supplementation technology available today. This involves a careful balance of total omega-6 and omega-3 fatty acids (ratio 4-11) as well as supplementation of a balance of short and long chain compounds in these major classifications to facilitate inflammation management. This is the reason for the supplementation of evening primrose oil and salmon oil in addition to canola oil in the subject formulations. This blend provides insurance for pets which may have low enzyme activities.

Since most true food allergens are proteins, management of dietary protein is important. This is why the total protein level is managed and a single source (chicken) is used in our formulations. Additionally, as with all Nature's Recipe products, natural preservatives and flavors are used and no colorants are added to the subject formulations. Since proteins can sometimes be found in unrefined fats and oils typically used in the pet food industry, we use highly refined human grade oils that are shipped under a nitrogen blanket to ensure freshness and retard oxidation.

A final dietary adjustment made only in the Non-Sporting formula is the use of agents to help control tartar accumulation. Some breeds including Poodles and Bichon Frise are thought to accumulate tartar at greater rates than others and/or suffer from a higher rate of periodontal disease. The present formulations comprise a patented tartar control agent called sodium hexametaphosphate which has been licensed exclusively to Heinz. It has been reported in peer-reviewed journals that this agent reduces the rate of tartar accumulation 80% when added in a complete meal. Until now this ingredient has only been added to pet treats. However, with dentists telling us to brush after every meal it was decided that it would be beneficial to incorporate such ingredient in the subject formulations so it would be consumed more frequently. Other ingredients such as bromelain and cranberry extract have also been reported to improve oral health and promote healing and are additionally included in this formulation.

Unique Features of The Herding Diet

The Herding formula is an excellent diet which provides a high energy level without excessive use of fat. It has been tested with police dogs in training, so it should serve the needs of pets in less stressful environments.

More specifically, some breeds in the herding group such as German Shepherds suffer from a gastrointestinal immune deficiency which manifests itself through chronic, intermittent diarrhea. Additionally, many of the breeds in this group as well as Working and Sporting group suffer from numerous bone and joint abnormalities, including hip and elbow dysplasia, panosteitis, and degenerative joint disease.

Since most breeds can experience diarrhea on occasion, particularly in response to stress, all Group Specific Formulas share a combination of ingredients to help maintain gastrointestinal function. One of these is the inclusion of high levels of rice which, in addition to being highly digestible, contain compounds which actually inhibit intestinal secretions. The diets also contain spearmint and ginger, thought to inhibit nausea which may lead to gastrointestinal disturbances. They also contain a blend of fruit and/or vegetable fibers (e.g., tomato pomace), chicory extract and *Yucca schidigera* extract which provide unique benefits relative to gastrointestinal health. The specific fibers used are moderately fermented similar to beet pulp but of more health origin (additionally provide antioxidants). While fiber used to be thought of as a filler, it is now recognized that fiber is important for intestinal health. Chicory extract contains inulin, the parent compound of fructooligosaccharides (FOS) found in IVD Select Care formulas and more recently in EukanuBA diets. This compound is termed a "prebiotic" in that it can be utilized by beneficial microorganisms like bifidobacteria and lactobacillus but not be harmful ones including Salmonella, Clostridia and *E. coli*. Simply put, it is food for good bugs. The chicory extract is a natural extract of the chicory root while the FOS used by EukanuBA is a fermentation product of sugar. Both chicory extract and *Yucca schidigera* extract act to bind bacterial toxins and ammonia and help to reduce stool odor. This effect has been noted both in humans and pets.

The unique fats and oils used in this product line also help to control inflammation both in gastrointestinal disturbances and in joint inflammation. Zinc in both inorganic and proteinate form is provided to assist in repair of intestinal cell damage. High levels of zinc have been used in many species with intestinal disorders with excellent results.

While these ingredient adjustments provide excellent protection of gastrointestinal function, the Herding diet adds other unique ingredients to protect this particular organ. One way is through the use of microbial cultures (probiotics or DFM) which provide beneficial organisms to the pet. This concept is similar to yogurt. They are added after the extrusion process to protect them from heat damage. In this particular formula a combination of *Lactobacillus acidophilus, Bacillus subtilis* and *Entercococcus faecium* is used because of their complementary action. Microbial cultures serve as a source of enzymes to help digest food, competitively exclude harmful bacteria, and synthesize various B vitamins and antimicrobial compounds. The combination of prebiotics and probiotics in the same product as a 1–2 punch has been termed "synbiotics" and is the most current trend in progressive yogurt cultures. In addition to the enzymes in these microbial cultures, the Herding diet contains bromelain, an extract of pineapple which contains a complex of several protein-digesting enzymes to complement the pet's natural digestive capabilities. A final ingredient which is supplemented is glutamine. This compound is a natural component of the body which is the primary fuel source for the intestinal cells and in particular immune cells of the gastrointestinal tract. It plays a similar role to butyric acid, provided by fiber fermentation, for health of cells of the colon. Although it may not help healthy animals at rest, it may be of benefit in stress conditions including weaning to prevent muscle breakdown as a source of this amino acid. In addition to the addition of these many functional ingredients, the calories from fat are reduced in the Hound diet.

The total calories are similar to many premium diets because of the high digestibility of this diet. The reason for the reduced fat is that, in the presence of gastrointestinal disturbances, fat digestion is most compromised and results in stool malodor from bacterial fermentation of fat. The fat management helps reduce the harm caused by intestinal dysfunction. The level of vitamin and trace mineral supplementation is higher in this diet than some of the other Group Specific Formulas to help utilization of energy, particularly in pets under stress.

As indicated previously, dietary adjustments are also made to ensure proper bone and joint function. Feeding instructions have been altered to a 15% reduction relative to groups with minimal bone and joint problems during the puppy phase and breeds with a propensity for obesity such as Collies and Shetland Sheepdogs reduced by a similar amount during the adult phase to minimize weight burden on the joints. Daily calcium consumption is also managed by this dietary restriction as it appears that the puppy of at least some large breeds are unable to regulate its calcium absorption. Sodium is also restricted to help minimize calcium mobilization from the bone as urinary sodium and calcium excretion run parallel to one another. Functional ingredients such as glucosamine are added to enhance proteoglycan synthesis and prevent its destruction. Aspirin and ibuprofen suppress pain but in fact suppress proteoglycan synthesis, preventing the body to self repair damage. Potassium citrate is used to adjust the mineral (acid-base) balance of the body and hopefully enhance bone mineral deposition. Research with several species including cats has indicated that diets with a low mineral balance (more acid in nature) cause bone demineralization. This would be particularly harmful in growing animals since bone formation itself generates acid. Bromelain has also been found to be of some benefit in joint disorders, perhaps through some yet unknown indirect anti-inflammatory mechanism.

As with intestinal disorders, all diets contain some dietary components to promote strong bones and joint function including the fatty acids listed above as well as potentially the yucca extract to control joint inflammation, manganese supplementation (cofactor in enzymes in chondroitin synthesis), zinc supplementation (protein and DNA synthesis), iron and vitamin C (for the hydroxylation of proline during collagen formation) and copper (for cross-linking of collagen molecules to provide cartilage strength)

as well as biotin and choline (for proteoglycan formation and aggregation). The ingredients listed above are added in the diets specifically designed for breed groups with a high propensity of bone and joint problems, including Herding dogs.

Unique Features of the Terrier Diet

The diet for this group has a fairly high protein level and high fat level relative to its total calories to meet the needs of the active terrier group. For breeds such as Cairn and Scottish Terriers, which may be "easy keepers" adult feeding directions recommend a 15% reduction relative to other breeds within this group.

A well-recognized problem within this group is a liver copper storage disease present in Bedlington Terriers and West Highland Terriers. It is estimated that in the former breed both England and the United States that approximately 25% of the animals are affected and an additional 50% are carriers as it is transmitted as an autosomal recessive gene. This condition bears some resemblance to Wilson's disease in humans which has an estimated worldwide incidence of approximately 1 in 30,000. This condition is characterized by a toxic accumulation of copper in the liver and brain, resulting in tremors, psychiatric disturbances, and liver degeneration in humans. This condition is typically treated by a combination of dietary copper restriction and additional zinc supplementation.

In humans, liver consumption is not recommended although recent studies have suggested that while copper in beef liver is highly available, that in pork is not. Zinc supplementation reduces the retention of copper in the body and thus has an indirect beneficial effect. Level of copper supplementation is lower and zinc higher in the Terrier formula than in any of the other Group Specific Formulas. Milk thistle has been added as a complementary ingredient to help maintain liver health. It contains a group of compounds called the silymarin complex of bioflavonoids. It both helps bind toxins to complement healthy liver function stimulates the production of several potent antioxidants (glutathione and superoxide dismutase) to protect the liver cells from oxidation and finally is thought to stimulate protein synthesis in the liver to enhance repair. This herb has been the subject of hundreds of clinical studies and has been supplemented in Europe for humans with alcoholism, chronic hepatitis and liver cirrhosis.

Unique Features of the Toy Diet

The Terrier formula is highly digestible but contains a managed level of protein and intermediate fat calories, ideal for the needs of active Toy breeds.

More specifically, the Toy formula is managed in protein and contains a high proportion of fat calories relative to several Group Specific Formulas. The rationale behind this is that some of the dogs in this group such as Pugs and Pekinese are brachycephalic and are somewhat intolerant of heat stress. Digestion and metabolism of protein generates more heat. Also, digestion and metabolism of fat generates less heat than carbohydrates. Consequently, these adjustments of protein and fat may be beneficial, particularly when pets are in warm environments or exercising outdoors in the summer. Additionally, sodium bicarbonate and potassium chloride are included to help encourage water consumption and to provide electrolytes. Chromium (from yeast) is incorporated since it appears in some species to reduce cortisol levels present when animals are exposed to stressors.

Additionally, it has been noted that some breeds such as Silky Terriers and Yorkshire Terriers are susceptible to diabetes. Certainly energy management to maintain optimum body condition is useful. As noted, chromium (from yeast) is supplemented, as well as niacin in this diet. These nutrients are thought to co-participate in a complex known as glucose tolerance factor which is thought to act to improve insulin sensitivity in the body. Additionally, results of recent research suggest that barley has a lower glycemic index in pet than other common grains such as corn or wheat or especially rice. This diet has the highest amount of barley among this line of products. It should be noted that such supplementation acts as a complement, not replacement to insulin administration (frequently required in canine diabetes).

Several breeds including the Yorkshire Terrier, Toy Poodle, Pomeranian, Shih Tzu, Affenpinscher and Pekinese can suffer from oxalate urinary calculi which are responsive to diet mineral adjustment away using alkalizing minerals such as sodium bicarbonates. Additionally, unlike cats, many of the stones in dogs are complicated by urinary tract infections. Cranberry extract is added to this formulation. This latter ingredient is widely utilized in humans for urinary tract infections and is thought to prevent bacterial adhesion to the urinary tract.

The small size of the Toy formula is also designed based on the relatively small mouth size of Toy breeds.

Unique Features of the Hound Diet

The Hound formula is an excellent diet which provides a high energy level without excessive use of fat. It has a very unique shape relative to any commercial diet. Specifically, the Hound formulation contains a high protein level but managed fat level. Many of the hound breeds are extremely lean and therefore would have a higher protein requirement. Some, however, such as Basset Hounds, Dachshunds and Beagles can become overweight with age and so a caloric reduction of 15% is similarly recommended for these breeds. Additionally, because of their relative body dimensions (short and long), disc disease can occur in Dachshunds and maintaining a lean body is important to reduce the stress on the vertebrae.

Similar to some of the Herding dogs, several animals in the Hound group including the Basenji, Beagle and Whippet can experience chronic, intermittent diarrhea. In the case of the Beagle it may result from a deficiency of intestinal immunity which resembles that in German Shepherds. To attempt to counteract this condition, all of the various ingredients mentioned previously for the Herding diet are added to the Herding formulation. This includes the addition of a high level of rice, a combination of probiotics (microbial cultures) and prebiotics (chicory root extract-inulin) which is termed synbiotics, inclusion of bromelain to assist in digestion, spearmint and ginger to soothe the stomach, glutamine and zinc to promote intestinal cell repair, and a blend of soluble and insoluble fibers to optimize intestinal environment. Additionally, garlic is thought to have some natural ability to inhibit growth of pathogenic organisms. The unique fat blend should help moderate intestinal inflammation.

In contrast to the Toy formula discussed earlier, the Hound diet is formulated with a more acid mineral balance as some breeds in this group such as Basset Hounds are more predisposed to stravite rather than oxalate urinary calculi. Cranberry extract is again added as a safeguard since bacterial infections can complicate this condition. Potassium citrate is still added to help complex calcium and reduce risked calcium oxalate stones as well. It is our belief that a moderate diet containing a mineral balance promoting a moderately acid urine combined with magnesium and citrate is a more effective approach to urinary tract health than an extreme diet which helps with one type of stone such as stravite but increases susceptibility to the other (such as calcium oxalate). From the standpoint of dogs susceptible to stravite stones, this diet should provide the most acidic urine among this diet line and is therefore likely to be most effective.

In order to further facilitate an understanding of the invention, the following examples are provided.

EXAMPLE 1

Non-Sporting Dog Formulation

A non-sporting dog formulation was formulated to provide for managed protein, moderate energy, highly digestible diet using wholesome grains like ground rice, rolled oats and cracked pearled barley. This product is formulated to maximize the benefits of good nutrition to all parts of the body, including the gastrointestinal tract. The formula includes Spearmint as well as Bromelain and is formulated to help maintain oral health. Herbs such as Ginkgo, Ginseng and Parsley assist in overall good pet health. This unique combination of ingredients provides excellent taste and 100% complete and balanced nutrition for all life stages.

This unique formulation for the NON-SPORTING GROUP breeds also contains a blend of Canola Oil, Salmon Oil and Evening Primrose Oil, a source of GLA (gamma linolenic acid), naturally preserved with Tocopherols. This, in combination with Chicken, provides an optimum balance from the full spectrum of polyunsaturated fatty acids including Omega 6 and Omega 3 for maintaining healthy skin and hair coat. In addition, this formula contains a special blend of antioxidant vitamins and minerals to prevent or neutralize the damaging effects of free radicals.

The specific ingredients in this formulation are as follows: Chicken, Ground Rice, Rolled Oats, Chicken Meal, Cracked Pearled Barley, Natural Flavor, Canola Oil (Preserved with Mixed Tocopherols, Rosemary Extract and Citric Acid), Bone Phosphate, Tomato Pomace, Brewers Dried Yeast, Sodium Hexametaphosphate, Chicory Root Extract, Potassium Chloride, Vitamins (Choline Chloride, Vitamin A Supplement, Vitamin $D_3$ Supplement, Vitamin E Supplement, Inositol, Niacin, Ascorbic Acid [Source of Vitamin C], d-Calcium Pantothenate, Thiamine Mononitrate, Riboflavin Supplement, Beta Carotene, Pyridoxine Hydrochloride [Vitamin $B_6$], Folic Acid, Menadione Sodium Bisulfite Complex [Source of Vitamin K activity], Biotin, Vitamin $B_{12}$ Supplement), Sodium Chloride, Salmon Oil, Evening Primrose Oil, Minerals (Zinc Oxide, Zinc Proteinate, Ferrous Sulfate, Iron Proteinate, Manganous Oxide, Copper Sulfate, Copper Proteinate, Calcium Iodate, Sodium Selenite), Potassium Citrate, Ginkgo Biloba Extract, *Yucca schidigera* Extract, Garlic Powder, Panax Ginseng Root Powder, Chinese Ginseng Root, Spearmint Leaf Powder, Eyebright Powder, Siberian Ginseng Extract, Parley Seed Oil Powder, Ginger Extract, Bromelain, and Marigold Extract.

Animal feed testing according to the procedures of the Association of American Feed Control Officials have shown that this formulation has a complete and balanced diet for all stages of life. The analysis of this formulation is provided below.

| ANALYSIS | |
|---|---|
| CRUDE PROTEIN | 22.0% MINIMUM |
| CRUDE FAT | 12.0% MINIMUM |
| CRUDE FIBER | 4.0% MAXIMUM |
| MOISTURE/ | 10.0% MAXIMUM |
| CALCIUM | 1.1% MINIMUM |
| PHOSPHORUS | 0.85% MINIMUM |
| OMEGA-6 FATTY ACIDS | 2.75%* MINIMUM |
| OMEGA-3 FATTY ACIDS | 0.3%* MINIMUM |
| GAMMA LINOLENIC ACID | 0.02%* MINIMUM |

*Not recognized as an essential nutrient by the AAFCO Dog Food Nutrient Profile.

The kibble shape of this formulation was specifically designed based on size, weight, and breed of dogs belonging to this particular group, as were the designated feeding guidelines below. The Non-Sporting Diet is shaped as a rectangle with length nearly 3 times the width. It is an extremely narrow kibble approximately 7 mm wide. This unique shape encourages chewing which may participate in its tartar control effects.

| | | |
|---|---|---|
| American Eskimo Dog | Dalmatian | Poodle |
| Bichon Frise | Finnish Spitz | Schipperke |
| Boston Terrier | French Bulldog | Shiba Inu |
| Bulldog | Keeshond | Tibetan Spaniel |
| Chinese Shar Pei | Lhasa Apso | Tibetan Terrier |
| Chow Chow | | |

As discussed, the nutritional requirements of dogs vary according to breed, age, size, activity and environment. From weaning to six months of age, feed the recommended amount in 3 feedings per day. Over six months of age, feed the recommended amount in 2 feedings per day. It is recommended that the subject formulation be consumed based on the following recommended guidelines.

| | Daily Feeding Guidelines | | |
|---|---|---|---|
| Weight of Dog (lbs.) | Weaning to 6 Months | 6–12 Months | Greater Than 12 Months † |
| 3–10 | 1¼–2¾ Cups | ⅞–2 Cups | ⅝–1⅜ Cups |
| 10–15 | 2¾–3½ Cups | 2–2⅝ Cups | 1⅜–1¾ Cups |
| 15–25 | 3½–5 Cups | 2⅝–3¾ Cups | 1¾–2½ Cups |
| 25–50 | 5–8 Cups | 3¾–6 Cups | 2½–4 Cups |
| 50–75 | 8–10⅜ Cups | 6–7⅞ Cups | 4–5¼ Cups |

Measurements are based on a standard 8 oz. cup which equal approximately 3.5 oz. of dry kibble.
† For gestation and lactation feed as much as 3 times the amount indicated in 3 feedings per day.

EXAMPLE 2

Toy Dog Formulation

As discussed above, the formulation for the TOY GROUP breeds contains a blend of Canola Oil, Salmon Oil and Evening Primrose Oil, a source of GLA (gamma linolenic acid), naturally preserved with Tocopherols. This, in combination with Chicken, provides an optimum balance from the full spectrum of polyunsaturated fatty acids including Omega 6 and Omega 3 for maintaining healthy skin and hair coat. In addition, this formula contains a special blend of antioxidant vitamins and minerals to prevent or neutralize the damaging effects of free radicals.

A Toy dog formulation was produced comprising the following ingredients: Chicken, Ground Rice, Rolled Oats, Chicken Meal, Cracked Pearled Barley, Natural Flavor, Canola Oil (Preserved with Mixed Tocopherols, Rosemary Extract and Citric Acid), Tomato Pomace, Brewers Dried Yeast, Bone Phosphate, Chicory Root Extract, Potassium Chloride, Sodium Bicarbonate, Vitamins (Choline Chloride, Vitamin A Supplement, Vitamin $D_3$ Supplement, Vitamin E Supplement, Inositol, Niacin, Ascorbic Acid [Source of Vitamin C], d-Calcium Pantothenate, Thiamine Mononitrate, Riboflavin Supplement, Beta Carotene, Pyridoxine Hydrochloride [Vitamin $B_6$], Folic Acid, Menadione Sodium Bisulfite Complex [Source of Vitamin K activity], Biotin, Vitamin $B_{12}$ Supplement), Salmon Oil, Evening Primrose Oil, Minerals (Zinc Oxide, Zinc Proteinate, Ferrous Sulfate, Iron Proteinate, Manganous Oxide, Copper Sulfate, Copper Proteinate, Calcium Iodate, Sodium Selenite), Ginkgo Biloba Extract, *Yucca schidigera* Extract, Garlic Powder, Panax Ginseng Root Powder, Chinese Ginseng Root, Spearmint Leaf Powder, Eyebright Powder, Cranberry Juice Concentrate, Siberian Ginseng Extract, Parsley Seed Oil Powder, Ginger Extract, and Marigold Extract. The analysis of this formulation is provided below.

| ANALYSIS | |
|---|---|
| CRUDE PROTEIN | 22.0% MINIMUM |
| CRUDE FAT | 12.0% MINIMUM |
| CRUDE FIBER | 4.0% MAXIMUM |
| MOISTURE | 10.0% MAXIMUM |
| CALCIUM | 1.0% MINIMUM |
| PHOSPHORUS | 0.80% MINIMUM |
| NIACIN | 100 mg/kg MINIMUM |
| CHROMIUM | 2.0 mg/kg* MINIMUM |
| OMEGA–6 FATTY ACIDS | 3.0%* MINIMUM |
| OMEGA–3 FATTY ACIDS | 0.3%* MINIMUM |
| GAMMA LINOLENIC ACID | 0.03%* MINIMUM |

*Not recognized as an essential nutrient by the AAFCO Dog Food Nutrient Profile.

As with the previous formulation, animal feeding tests using the procedures of the Association of American Feed Control Officials indicate that this formulation provides complete and balanced nutrition for all stages of life.

Again, for this formulation, the kibble shape was specifically designed based on size, weight, and breed of dogs belonging to this particular group, as were the designated feeding guidelines below. The Toy diet is a small cylindrical kibble of diameter 8.5 mm, the smallest of the round kibble in this line. This smaller round kibble fits nicely in the mouth of many Toy breeds with small square mouths.

| | | |
|---|---|---|
| Affenpinscher | Japanese Chin | Pomeranian |
| Brussels Griffon | Maltese | Toy Poodle |
| Cavalier King Charles Spaniel | Toy Manchester Terrier | Pug |
| Chihuahua | Miniature Pinscher | Shih Tzu |
| Chinese Crested | Papillon | Silky Terrier |
| English Toy Spaniel | Pekingese | Yorkshire Terrier |
| Italian Greyhound | | |

Feeding Guidelines

It is recommended that from weaning to six months of age, the recommended amount be fed three times per day. Over six months of age, it is recommended that this be reduced to two feedings per day.

| Daily Feeding Guidelines | | | |
|---|---|---|---|
| Weight of Dog (lbs.) | Weaning to 6 Months | 6–12 Months | Greater Than 12 Months †‡ |
| 2–5 | ⅞–1½ Cups | ⅝–1⅛ Cups | ⅜–¾ Cups |
| 5–10 | 1½–2½ Cups | 1⅛–1⅞ Cups | ¾–1¼ cups |
| 10–15 | 2½–3¼ Cups | 1⅞–2⅜ Cups | 1¼–1⅝ Cups |
| 15–25 | 3¼–4 ½ Cups | 2⅜–3⅜ Cups | 1⅝–2¼ Cups |

Measurements are based on a standard 8 oz. cup which equal approximately 3.5 oz. of dry kibble.
†For gestation and lactation feed as much as 3 times the amount indicated in 3 feedings per day.

EXAMPLE 3

Terrier Dog Formulation

As discussed supra, the TERRIER GROUP breed formulation contains a blend of Canola Oil, Salmon Oil and Evening Primrose Oil, a source of GLA (gamma linolenic acid), naturally preserved with Tocopherols. This, in combination with Chicken, provides an optimum balance from the full spectrum of polyunsaturated fatty acids including Omega 6 and Omega 3 for maintaining healthy skin and hair coat. In addition, this formula contains a special blend of antioxidant vitamins and minerals to prevent or neutralize the damaging effects of free radicals.

Based on the foregoing, a Terrier dog formulation comprising the following ingredients and analysis was produced: Chicken, Ground Rice, Rolled Oats, Chicken Meal, Cracked Pearled Barley, Natural Flavor, Canola Oil (Preserved with Mixed Tocopherols, Rosemary Extract and Citric Acid), Tomato Pomace, Brewers Dried Yeast, Chicory Root Extract, Potassium Chloride, Bone Phosphate, Vitamins (Choline Chloride, Vitamin A Supplement, Vitamin $D_3$ Supplement, Vitamin E Supplement, Inositol, Niacin, Ascorbic Acid [Source of Vitamin C], d-Calcium Pantothenate, Thiamine Mononitrate, Riboflavin Supplement, Beta Carotene, Pyridoxine Hydrochloride [Vitamin $B_6$], Folic Acid, Menadione Sodium Bisulfite Complex [Source of Vitamin K activity], Biotin, Vitamin $B_{12}$ Supplement), Sodium Chloride, Salmon Oil, Evening Primrose Oil, Minerals (Zinc Oxide, Zinc Proteinate, Ferrous Sulfate, Iron Proteinate, Manganous Oxide, Copper Sulfate, Copper Proteinate, Calcium Iodate, Sodium Selenite), Milk Thistle Powder, Ginkgo Biloba Extract, *Yucca schidigera* Extract, Garlic Powder, Panax Ginseng Root Powder, Chinese Ginseng Root, Spearmint Leaf Powder, Eyebright Powder, Siberian Ginseng Extract, Parsley Seed Oil Powder, Ginger Extract, and Marigold Extract. The analysis of this formulation is provided below.

| ANALYSIS | |
|---|---|
| CRUDE PROTEIN | 25.0% MINIMUM |
| CRUDE FAT | 12.0% MINIMUM |
| CRUDE FIBER | 4.0% MAXIMUM |
| MOISTURE | 10.0% MAXIMUM |

-continued

| ANALYSIS | |
|---|---|
| CALCIUM | 1.0% MINIMUM |
| PHOSPHORUS | 0.85% MINIMUM |
| COPPER | 7.5 mg/kg MINIMUM |
| ZINC | 300 mg/kg MINIMUM |
| OMEGA-6 FATTY ACIDS | 3.0%* MINIMUM |
| OMEGA-3 FATTY ACIDS | 0.3%* MINIMUM |
| GAMMA LINOLENIC ACID | 0.03%* MINIMUM |

*Not recognized as an essential nutrient by the AAFCO Dog Food Nutrient Profile.

Similarly, animal feeding tests using the procedures of the Association of American Feed Control Officials have shown that NATURE'S RECIPE TERRIER DOGS GROUP SPECIFIC FORMULA provides a complete and balanced nutrition for all stages of life.

The kibble shape of this formulation was again specifically designed based on size, weight, and breed of dogs belonging to this particular group, as were the designated feeding guidelines below. The Terrier diet has a square shape of intermediate size 11.5 mm per side. This shape resembles the square shape of the skull of the Airedale Terrier, Irish Terrier, and Welsh Terrier.

| | | |
|---|---|---|
| Airedale Terrier | Wire Fox Terrier | Norwich Terrier |
| American Staffordshire Terrier | Irish Terrier | Scottish Terrier |
| Australian Terrier | Kerry Blue Terrier | Sealyham Terrier |
| Bedlington Terrier | Lakeland Terrier | Skye Terrier |
| Border Terrier | Standard Manchester Terrier | Soft Coated Wheaten Terrier |
| Bull Terrier | Miniature Bull Terrier | Staffordshire Bull Terrier |
| Cairn Terrier | Miniature Schnauzer | Welsh Terrier |
| Dandie Dinmont Terrier | Norfolk Terrier | West Highland White Terrier |
| Smooth Fox Terrier | | |

Recommended Feeding Instructions

It is recommended that from weaning to six months of age, the recommended amount be given in three feedings per day. Over six months of age, it is recommended that the amount be reduced to two feedings per day.

Daily Feeding Guidelines

| Weight of Dog (lbs.) | Weaning to 6 Months | 6–12 Months | Greater Than 12 Months †‡ |
|---|---|---|---|
| 3–10 | 1⅛–2½ Cups | ⅞–1⅞ Cups | ½–1¼ Cups |
| 10–15 | 2½–4 Cups | 1⅞–2½ Cups | 1¼–1⅝ Cups |
| 15–25 | 4–4⅝ Cups | 2½–3½ Cups | 1⅝–2¼ cups |
| 25–50 | 4⅝–7⅜ Cups | 3½–5½ Cups | 2¼–3⅝ Cups |
| 50–75 | 7⅜–9⅝ Cups | 5½–7¼ Cups | 3⅜–4¾ Cups |

Measurements are based on a standard 8 oz. cup which equal approximately 3.5 oz. of dry kibble.
†For gestation and lactation feed as much as 3 times the amount indicated in 3 feedings per day.
‡For Cairn and Scottish Terriers feed 15% less than the amount indicated.

EXAMPLE 4

Working Dog Formulation

As discussed supra, the WORKING GROUP breed formulation contains a blend of Canola Oil, Salmon Oil and Evening Primrose Oil, a source of GLA (gamma linolenic acid), naturally preserved with Tocopherols. This, in combination with Chicken, provides an optimum balance from the full spectrum of polyunsaturated fatty acids including Omega 6 and Omega 3 for maintaining healthy skin and hair coat. In addition, this formula contains a special blend of antioxidant vitamins and minerals to prevent or neutralize the damaging effects of free radicals.

Based on the foregoing, a Working Group Formulation was designed comprising the following ingredients and analysis: Chicken, Ground Rice, Rolled Oats, Chicken Meal, Cracked Pearled Barley, Natural Flavor, Canola Oil (Preserved with Mixed Tocopherols, Rosemary Extract and Citric Acid), Tomato Pomace, Brewers Dried Yeast, Chicory Root Extract, Bone Phosphate, Potassium Chloride, Vitamins (Choline Chloride, Vitamin A Supplement, Vitamin $D_3$ Supplement, Vitamin E Supplement, Inositol, Niacin, Ascorbic Acid [Source of Vitamin C], d-Calcium Pantothenate, Thiamine Mononitrate, Riboflavin Supplement, Beta Carotene, Pyridoxine Hydrochloride [Vitamin $B_6$], Folic Acid, Menadione Sodium Bisulfite Complex [Source of Vitamin K activity], Biotin, Vitamin $B_{12}$ Supplement), Salmon Oil, Evening Primrose Oil, Minerals (Zinc Oxide, Zinc Proteinate, Ferrous Sulfate, Iron Proteinate, Manganous Oxide, Copper Sulfate, Copper Proteinate, Calcium Iodate, Sodium Selenite), Potassium Citrate, Glucosamine Hydrochloride, Hawthorn Berry Powder, Ginkgo Biloba Extract, *Yucca schidigera* Extract, Taurine, Panax Ginseng Root Powder, Chinese Ginseng Root, Spearmint Leaf Powder, Garlic Powder, Eyebright Powder, Siberian Ginseng Extract, Parsley Seed Oil Powder, Ginger Extract, and Marigold Extract. The analysis of this formulation is provided below.

| ANALYSIS | |
|---|---|
| CRUDE PROTEIN | 24.0% MINIMUM |
| CRUDE FAT | 13.0% MINIMUM |
| CRUDE FIBER | 4.0% MAXIMUM |
| MOISTURE | 10.0% MAXIMUM |
| CALCIUM | 1.1% MINIMUM |
| PHOSPHORUS | 0.85% MINIMUM |
| SELENIUM | 0.4 mg/kg MINIMUM |
| TAURINE | 0.05%* MINIMUM |
| OMEGA-6 FATTY ACIDS | 3.0%* MINIMUM |
| OMEGA-3 FATTY ACIDS | 0.4%* MINIMUM |
| GAMMA LINOLENIC ACID | 0.05%* MINIMUM |

*Not recogtiized as an essential nutrient by the AAFCO Dog Food Nutrient Profile.

Again, animal feeding tests using the procedures of the Association of American Feed Control Officials substantiate that the above NATURE'S RECIPE WORKING DOGS GROUP SPECIFIC FORMULA provides complete and balanced nutrition for all stages of life.

Again, the kibble shape of this formulation was specifically designed based on size, weight, and breed of dogs belonging to this particular group, as were the designated feeding guidelines below. The Working diet is a flattened disc kibble 12 mm in diameter. Being intermediate in size and thickness, it suits the diversity of mouth configurations of this group.

| | | |
|---|---|---|
| Akita | Great Dane | Portuguese Water Dog |
| Alaskan Malamute | Great Pyrenees | Rottweiler |
| Bernese Mountain Dog | Great Swiss Mountain Dog | Saint Bernard |

-continued

| Boxer | Komondor | Samoyed |
|---|---|---|
| Bullmastiff | Kuvasz | Siberian Husky |
| Doberman Pinscher | Mastiff | Standard Schnauzer |
| Giant Schnauzer | Newfoundland | |

Recommended Feeding Instructions

From weaning to six months of age, feed the recommended amount in three feedings per day. Over six months of age, the recommended amount is reduced to two feedings per day.

Daily Feeding Guidelines

| Weight of Dog (lbs.) | Weaning to 6 Months | 6–12 Months | Greater Than 12 Months † |
|---|---|---|---|
| 3–10 | 1–2⅛ Cups | ¾–1⅝ Cups | ⅝–1¼ Cups |
| 10–20 | 2⅛–3½ Cups | 1⅝–2⅝ Cups | 1¼–2 Cups |
| 20–50 | 3½–6⅜ Cups | 2⅝–4¾ Cups | 2–3¾ Cups |
| 50–100 | 6⅜–10⅛ Cups | 4¾–7⅝ Cups | 3¾ Cups–6 Cups |
| Over 100 | | | Add ⅜ cup for each 10 lbs. |

Measurements are based on a standard 8 oz. cup wkich equal approximately 3.5 oz. of dry kibble.
†For gestation and lactation feed as much as 3 times the amount indicated in 3 feedings per day.

EXAMPLE 5

Hound Dog Formulation

As discussed supra, the HOUND GROUP breed formulation also contains a blend of Canola Oil, Salmon Oil and Evening Primrose Oil, a source of GLA (gamma linolenic acid), naturally preserved with Tocopherols. This, in combination with Chicken, provides an optimum balance from the full spectrum of polyunsaturated fatty acids including Omega 6 and Omega 3 for maintaining healthy skin and hair coat. In addition, this formula contains a special blend of antioxidant vitamins and minerals to prevent or neutralize the damaging effects of free radicals.

Based on the foregoing, a formulation designed for Hound Dogs comprising the following ingredients and analysis was made: Chicken, Ground Rice, Rolled Oats, Chicken Meal, Cracked Pearled Barley, Natural Flavor, Canola Oil (Preserved with Mixed Tocopherols, Rosemary Extract and Citric Acid), Tomato Pomace, Brewers Dried Yeast, Chicory Root Extract, Bone Phosphate, Potassium Chloride, Vitamins (Choline Chloride, Vitamin A Supplement, Vitamin $D_3$ Supplement, Vitamin E Supplement, Inositol, Niacin, Ascorbic Acid [Source of Vitamin C], d-Calcium Pantothenate, Thiamine Mononitrate, Riboflavin Supplement, Beta Carotene, Pyridoxine Hydrochloride [Vitamin $B_6$], Folic Acid, Menadione Sodium Bisulfite Complex [Source of Vitamin K activity], Biotin, Vitamin $B_{12}$ Supplement), Salmon Oil, Evening Primrose Oil, Minerals (Zinc Oxide, Zinc Proteinate, Ferrous Sulfate, Iron Proteinate, Manganous Oxide, Copper Sulfate, Copper Proteinate, Calcium Iodate, Sodium Selenite), Potassium Citrate, *Lactobacillus acidophilus, Entercococcus faecium, Bacillus subtilis* Fermentation Extract, *Aspergillus oryzae* Fermentation Extract, *Aspergillus niger* Fermentation Extract, Ginkgo Biloba Extract, *Yucca schidigera* Extract, Garlic Powder, Panax Ginseng Root Powder, Chinese Ginseng Root, Spearmint Leaf Powder, Eyebright Powder, Cranberry Juice Concentrate, Siberian Ginseng Extract, Parsley Seed Oil Powder, Glutamine, Ginger Extract, Bromelain, and Marigold Extract. The analysis of this formulation is provided below.

| ANALYSIS | | |
|---|---|---|
| CRUDE PROTEIN | 26.0% | MINIMUM |
| CRUDE FAT | 10.0% | MINIMUM |
| CRUDE FIBER | 4.0% | MAXIMUM |
| MOISTURE | 10.0% | MAXIMUM |
| CALCIUM | 1.0% | MINIMUM |
| PHOSPHORUS | 0.8% | MINIMUM |
| OMEGA-6 FATTY ACIDS | 2.75%* | MINIMUM |
| OMEGA-3 FATTY ACIDS | 0.2%* | MINIMUM |
| GAMMA LINOLENIC ACID | 0.02%* | MINIMUM |

*Not recognized as an essential nutrient by the AAFCO Dog Food Nutrient Profile.

Animal feeding tests using the procedures of the Association of American Feed Control Officials substantiate that NATURE'S RECIPE HOUND DOGS GROUP SPECIFIC FORMULA provides a complete and balanced nutrition for all stages of life.

Again, the kibble shape of this formulation was specifically designed based on size, weight, and breed of dogs belonging to this particular group, as were the designated feeding guidelines below. The Hound diet can best be described as an almond or tear drop shape. It has a length at longest point slightly shorter than the Non-Sporting diet. This shape perfectly conforms to breeds of this group such as the Afghan Hound.

| | | |
|---|---|---|
| Afghan Hound | American Foxhound | Otterhound |
| Basenji | English Foxhound | Petit Basset Griffon Vendéen |
| Basset Hound | Greyhound | Pharaoh Hound |
| Beagle | Harrier | Rhodesian Ridgeback |
| Black & Tan Coonhound | Ibizan Hound | Saluki |
| Bloodhound | Irish Wolfhound | Scottish Deerhound |
| Borzoi | Norwegian Elkhound | Whippet |
| Dachshund | | |

Recommended Feeding Instructions

From weaning to six months of age, feed the recommended amount in three feedings per day. Over six months of age, feed the recommended amount is reduced to two feedings per day.

Daily Feeding Guidelines

| Weight of Dog (lbs.) | Weaning to 6 Months | 6–12 Months | Greater Than 12 Months †‡ |
|---|---|---|---|
| 3–10 | 1⅛–2⅝ Cups | ⅞–2 Cups | ⅝–1⅜ Cups |
| 10–20 | 2⅝–4¼ Cups | 2–3⅛ Cups | 1⅜–2⅛ Cups |
| 20–50 | 4¼–7⅞ Cups | 3⅛–5⅞ Cups | 2⅛–3⅞ Cups |
| 50–100 | 7⅞–12⅜ Cups | 5⅞–9⅜ Cups | 3⅞–6¼ Cups |
| Over 100 | | | Add 3/8 cup for each 10 lbs. |

Measurements are based on a standard 8 oz. cup which equal approximately 3.5 oz. of dry kibble.
†For gestation and lactation feed as much as 3 times the amount indicated in 3 feedings per day.
‡For Basset Hounds, Dachshunds and Beagles feed 15% less than the amount indicated.

EXAMPLE 6

Herding Dog Formulation

As discussed supra, the HERDING GROUP breed formulation contains a blend of Canola Oil, Salmon Oil and Evening Primrose Oil, a source of GLA (gamma linolenic acid), naturally preserved with Tocopherols. This, in combination with Chicken, provides an optimum balance from the full spectrum of polyunsaturated fatty acids including Omega 6 and Omega 3 for maintaining healthy skin and hair coat. In addition, this formula contains a special blend of antioxidant vitamins and minerals to prevent or neutralize the damaging effects of free radicals.

Based on the foregoing, a formulation adapted for Herding Dogs comprising the following ingredients and analysis was made: Chicken, Ground Rice, Rolled Oats, Chicken Meal, Cracked Pearled Barley, Natural Flavor, Canola Oil (Preserved with Mixed Tocopherols, Rosemary Extract and Citric Acid), Tomato Pomace, Brewers Dried Yeast, Chicory Root Extract, Bone Phosphate, Potassium Chloride, Vitamins (Choline Chloride, Vitamin A Supplement, Vitamin $D_3$ Supplement, Vitamin E Supplement, Inositol, Niacin, Ascorbic Acid [Source of Vitamin C], d-Calcium Pantothenate, Thiamine Mononitrate, Riboflavin Supplement, Beta Carotene, Pyridoxine Hydrochloride [Vitamin $B_6$], Folic Acid, Menadione Sodium Bisulfite Complex [Source of Vitamin K activity], Biotin, Vitamin $B_{12}$ Supplement), Salmon Oil, Evening Primrose Oil, Minerals (Zinc Oxide, Zinc Proteinate, Ferrous Sulfate, Iron Proteinate, Manganous Oxide, Copper Sulfate, Copper Proteinate, Calcium Iodate, Sodium Selenite), Potassium Citrate, *Lactobacillus acidophilus, Entercococcus faecium, Bacillus subtilis* Fermentation Extract, *Aspergillus oryzae* Fermentation Extract, *Aspergillus niger* Fermentation Extract, Glucosamine Hydrochloride, Ginkgo Biloba Extract, *Yucca schidigera* Extract, Panax Ginseng Root Powder, Spearmint Leaf Powder, Eyebright Powder, Siberian Ginseng Extract, Chinese Ginseng Root, Parsley Seed Oil Powder, Ginger Extract, Glutamine, Bromelain, Marigold Extract. The analysis of this specific formulation is provided below.

| ANALYSIS | |
|---|---|
| CRUDE PROTEIN | 24.0% MINIMUM |
| CRUDE FAT | 10.0% MINIMUM |
| CRUDE FIBER | 4.0% MAXIMUM |
| MOISTURE | 10.0% MAXIMUM |
| CALCIUM | 1.0% MINIMUM |
| PHOSPHORUS | 0.8% MINIMUM |
| OMEGA-6 FATTY ACIDS | 2.75%* MINIMUM |
| OMEGA-3 FATTY ACIDS | 0.2%* MINIMUM |
| GAMMA LINOLENIC ACID | 0.02%* MINIMUM |

*Not recognized as an essential nutrient by the AAFCO Dog Food Nutrient Profile.

Animal feeding tests using the procedures of the Association of American Feed Control Officials substantiate that NATURE'S RECIPE HERDING DOGS GROUP SPECIFIC FORMULA provides a complete and balanced nutrition for all stages of life.

The kibble shape of this formulation was again specifically designed based on size, weight, and breed of dogs belonging to this particular group, as were the designated feeding guidelines below. The Herding diet somewhat resembles the Working diet which relates to the fact that these breeds were at one time in a single group. The Herding diet has a smaller diameter (10.5 mm vs. 12 mm) but is thicker (8 mm vs. 6 mm) than the Working formula.

| | | |
|---|---|---|
| Australian Cattle Dog | Border Collie | Old English Sheepdog |
| Australian Shepherd | Bouvier Des Flandres | Puli |
| Bearded Collie | Briard | Shetland Sheepdog |
| Belgian Malinois | Canaan | Cardigan Welsh Corgi |
| Belgian Sheepdog | Collie | Pembroke Welsh Corgi |
| Belgian Tervuren | German Shepherd Dog | |

Recommended Feeding Guidelines

From weaning to six months of age, feed the recommended amount in three feedings per day. Over six months of age, the recommended amount is reduced to two feedings per day.

| Daily Feeding Guidelines | | | |
|---|---|---|---|
| Weight of Dog (lbs.) | Weaning to 6 Months | 6–12 Months | Greater than 12 Months †‡ |
| 3–10 | 1–2⅛ Cups | ¾–1⅝ Cups | ⅝–1¼ Cups |
| 10–20 | 2⅛–3½ Cups | 1⅝–2⅝ Cups | 1¼–2 Cups |
| 20–50 | 3–6⅜ Cups | 2⅝–4¾ Cups | 2–3¾ Cups |
| 50–100 | 6⅜–10⅛ Cups | 4¾–7⅝ Cups | 3¾ Cups–6 Cups |
| Over 100 | | | Add ⅜ cup for each 10 lbs. |

Measurements are based on a standard 8 oz. cup which equal approximately 3.5 oz. of dry kibble.
† For gestation and lactation feed as much as 3 times the amount indicated in 3 feedings per day.
‡ For Collies and Shetland Sheepdogs feed 15% less than the amount indicated.

EXAMPLE 7

Sporting Dog Formulation

As discussed supra, the SPORTING GROUP breed formula contains a blend of Canola Oil, Salmon Oil and Evening Primrose Oil, a source of GLA (gamma linolenic acid), naturally preserved with Tocopherols. This, in combination with Chicken, provides an optimum balance from the full spectrum of polyunsaturated fatty acids including Omega 6 and Omega 3 for maintaining healthy skin and hair coat. In addition, this formula contains a special blend of antioxidant vitamins and minerals to prevent or neutralize the damaging effects of free radicals.

Based on the foregoing, a formulation designed for Sport Group Dogs comprising the following ingredients and analysis was produced: Chicken, Ground Rice, Chicken Meal, Natural Flavor, Canola Oil (Preserved with Mixed Tocopherols, Rosemary Extract and Citric Acid), Tomato Pomace, Brewers Dried Yeast, Chicory Root Extract, Potassium Chloride, Sodium Bicarbonate, Vitamins (Choline Chloride, Vitamin A Supplement, Vitamin $D_3$ Supplement, Vitamin E Supplement, Inositol, Niacin, Ascorbic Acid [Source of Vitamin C], d-Calcium Pantothenate, Thiamine Mononitrate, Riboflavin Supplement, Beta Carotene, Pyridoxine Hydrochloride [Vitamin $B_6$], Folic Acid, Menadione Sodium Bisulfite Complex [Source of Vitamin K activity], Biotin, Vitamin $B_{12}$ Supplement), Salmon Oil, Evening Primrose Oil, Minerals (Zinc Oxide, Zinc Proteinate, Ferrous Sulfate, Iron Proteinate, Manganous Oxide, Copper Sulfate, Copper Proteinate, Calcium Iodate, Sodium Selenite), Glucosamine Hydrochloride, Hawthorn Berry Powder, Ginkgo Biloba Extract, *Yucca schidigera* Extract, Taurine, Panax Ginseng Root Powder, Chinese Ginseng Root, Spearmint Leaf Powder, Eyebright Powder, Siberian Ginseng Extract, Parley Seed Oil Powder, Ginger Extract, Glutamine, and Marigold Extract. The analysis of this formulation is provided below.

| ANALYSIS | |
|---|---|
| CRUDE PROTEIN | 25.0% MINIMUM |
| CRUDE FAT | 15.0% MINIMUM |
| CRUDE FIBER | 3.0% MAXIMUM |
| MOISTURE | 10.0% MAXIMUM |
| CALCIUM | 1.0% MAXIMUM |
| PHOSPHORUS | 0.8% MAXIMUM |
| SODIUM | 0.40% MINIMUM |
| TAURINE | 0.05%* MINIMUM |
| OMEGA-6 FATTY ACIDS | 30.%* MINIMUM |
| OMEGA-3 FATTY ACIDS | 0.4%* MINIMUM |
| GAMMA LINOLENIC ACID | 0.025%* MINIMUM |

*Not recognized as an essential nutrient by the AAFCO Dog Food Nutrient Profile.

Animal feeding tests using the procedures of the Association of American Feed Control Officials also indicate that the above NATURE'S RECIPE SPORTING DOGS GROUP SPECIFIC FORMULA provides a complete and balanced nutrition for all stages of life.

The kibble shape of this fonnulation was again specifically designed based on size, weight, and breed of dogs belonging to this particular group, as were the designated feeding guidelines below. The Sporting Diet has a unique triangle shape, well suited to the prevalence of pointed jaws of the breeds in this group.

| | | |
|---|---|---|
| Brittany | Labrador Retriever | English Springer Spaniel |
| Pointer | English Setter | Field Spaniel |
| German Shorthaired Pointer | Gordon Setter | Irish Water Spaniel |
| German Wirehaired Pointer | Irish Setter | Sussex Spaniel |
| Chesapeake Bay Retriever | American Water Spaniel | Welsh Springer Spaniel |
| Curly-Coated Retriever | Cocker Spaniel | Vizsla |
| Flat-Coated Retriever | Cocker Spaniel | Weimaraner |
| Golden Retriever | English Cocker Spaniel | Wirehaired Pointing Griffon |

Recommended Feeding Guidelines

From weaning to six months of age, feed the recommended amount in three feedings per day. Over six months of age, the recommended feeding amount is reduced to two feedings per day.

| | Daily Feeding Guidelines | | |
|---|---|---|---|
| Weight of Dog (lbs.) | Weaning to 6 Months | 6–12 Months | Greater Than 12 Months †‡ |
| 3–10 | ⅞–1⅞ Cups | ⅝–1⅜ Cups | ½–1¼ Cups |
| 10–20 | 1⅞–3 Cups | 1⅜–2¼ Cups | 1¼–1¾ Cups |
| 20–50 | 3–5⅝ Cups | 2¼–4¼ Cups | 1¾–3¼ Cups |
| 50–100 | 5⅝–9 Cups | 4¼–6¾ Cups | 3¼–5⅛ Cups |
| Over 100 | | | Add ⅜ cup for each 10 lbs. |

Measurements are based on a standard 8 oz. cup which equal approximately 3.5 oz. of dry kibble.
† For gestation and lactation feed as much as 3 times the amount indicated in 3 feedings per day.
‡ For Labrador Retriever and Cocker Spaniels feed 15% less than the amount indicated.

What is claimed is:

1. A pet food formulation which is adapted for non-sporting dogs that comprises the following ingredients: Chicken, Ground Rice, Rolled Oats, Chicken Meal, Cracked Pearled Barley, Natural Flavor, Canola Oil Preserved with Mixed Tocopherols, Rosemary Extract and Citric Acid, Bone Phosphate, Tomato Pomace, Brewers Dried Yeast, Sodium Hexametaphosphate, Chicory Root Extract, Potassium Chloride, Vitamins comprising Choline Chloride, Vitamin A Supplement, Vitamin $D_3$ Supplement, Vitamin E Supplement, Inositol, Niacin, Ascorbic Acid or a Source of Vitamin C, d-Calcium Pantothenate, Thiamine Mononitrate, Riboflavin Supplement, Beta Carotene, Pyridoxine Hydrochloride or Vitamin $B_6$, Folic Acid, Menadione Sodium Bisulfite Complex or a Source of Vitamin K activity, Biotin, and Vitamin $B_{12}$ Supplement, Sodium Chloride Salmon Oil, Evening Primrose Oil, Minerals comprising Zinc Oxide, Zinc Proteinate, Ferrous Sulfate, Iron Proteinate, Manganous Oxide, Copper Sulfate, Copper Proteinate, Calcium Iodate, and Sodium Selenite, Potassium Citrate, Ginkgo Biloba Extract, *Yucca schidigera* Extract, Garlic Powder, Panax Ginseng Root Powder, Chinese Ginseng Root, Spearmint Leaf Powder, Eyebright Powder, Siberian Ginseng Extract, Parsley Seed Oil Powder, Ginger Extract, Bromelain, and Marigold Extract.

2. A pet food formulation which is adapted for toy dogs that comprises the following ingredients: Chicken, Ground Rice, Rolled Oats, Chicken Meal, Cracked Pearled Barley, Natural Flavor, Canola Oil Preserved with Mixed Tocopherols, Rosemary Extract and Citric Acid, Tomato Pomace, Brewers Dried Yeast, Bone Phosphate, Chicory Root Extract, Potassium Chloride, Sodium Bicarbonate, Vitamins comprising Choline Chloride, Vitamin A Supplement, Vitamin $D_3$ Supplement, Vitamin E Supplement, Inositol, Niacin, Ascorbic Acid or a Source of Vitamin C, d-Calcium Pantothenate, Thiamine Mononitrate, Riboflavin Supplement, Beta Carotene, Pyridoxine Hydrochloride or Vitamin $B_6$, Folic Acid, Menadione Sodium Bisulfite Complex or a Source of Vitamin K activity, Biotin, and Vitamin $B_{12}$ Supplement, Salmon Oil, Evening Primrose Oil, Minerals comprising Zinc Oxide, Zinc Proteinate, Ferrous Sulfate, Iron Proteinate, Manganous Oxide, Copper Sulfate, Copper Proteinate, Calcium Iodate, and Sodium Selenite, Ginkgo Biloba Extract, *Yucca schidigera* Extract, Garlic Powder, Panax Ginseng Root Powder, Chinese Ginseng Root, Spearmint Leaf Powder, Eyebright Powder, Cranberry Juice Concentrate, Siberian Ginseng Extract, Parsley Seed Oil Powder, Ginger Extract, and Marigold Extract.

3. A pet food formulation which is adapted for terrier dogs that comprises the following ingredients: Chicken, Ground Rice, Rolled Oats, Chicken Meal, Cracked Pearled Barley, Natural Flavor, Canola Oil Preserved with Mixed Tocopherols, Rosemary Extract and Citric Acid, Tomato Pomace, Brewers Dried Yeast, Chicory Root Extract, Potassium Chloride, Bone Phosphate, Vitamins comprising Choline Chloride, Vitamin A Supplement, Vitamin $D_3$ Supplement, Vitamin E Supplement, Inositol, Niacin, Ascorbic Acid or a Source of Vitamin C, d-Calcium Pantothenate, Thiamine Mononitrate, Riboflavin Supplement, Beta Carotene, Pyridoxine Hydrochloride or Vitamin $B_6$, Folic Acid, Menadione Sodium Bisulfite Complex or a Source of Vitamin K activity, and Biotin, and Vitamin $B_{12}$ Supplement, Sodium Chloride, Salmon Oil, Evening Primrose Oil, Minerals comprising Zinc Oxide, Zinc Proteinate, Ferrous Sulfate, Iron Proteinate, Manganous Oxide, Copper Sulfate, Copper Proteinate, Calcium Iodate, and Sodium Selenite, Milk Thistle Powder, Ginkgo Biloba Extract, *Yucca schidigera* Extract, Garlic Powder, Panax Ginseng Root Powder, Chinese Ginseng Root, Spearmint Leaf Powder, Eyebright Powder, Siberian Ginseng Extract, Parsley Seed Oil Powder, Ginger Extract, and Marigold Extract.

4. A pet food formulation which is adapted for working dogs that comprises the following ingredients: Chicken, Ground Rice, Rolled Oats, Chicken Meal, Cracked Pearled Barley, Natural Flavor, Canola Oil Preserved with Mixed Tocopherols, Rosemary Extract and Citric Acid, Tomato Pomace, Brewers Dried Yeast, Chicory Root Extract, Bone Phosphate, Potassium Chloride, Vitamins comprising Choline Chloride, Vitamin A Supplement, Vitamin $D_3$ Supplement, Vitamin E Supplement, Inositol, Niacin, Ascorbic Acid or a Source of Vitamin C, d-Calcium Pantothenate, Thiamine Mononitrate, Riboflavin Supplement, Beta Carotene, Pyridoxine Hydrochloride or Vitamin $B_6$, Folic Acid, Menadione Sodium Bisulfite Complex or a Source of Vitamin K activity, and Biotin, Vitamin $B_{12}$ Supplement, Salmon Oil, Evening Primrose Oil, Minerals comprising Zinc Oxide, Zinc Proteinate, Ferrous Sulfate, Iron Proteinate, Manganous Oxide, Copper Sulfate, Copper Proteinate, Calcium Iodate, and Sodium Selenite, Potassium Citrate, Glucosamine Hydrochloride, Hawthorn Berry Powder, Ginkgo Biloba Extract, *Yucca schidigera* Extract, Taurine, Panax Ginseng Root Powder, Chinese Ginseng Root, Spearmint Leaf Powder, Garlic Powder, Eyebright Powder, Siberian Ginseng Extract, Parsley Seed Oil Powder, Ginger Extract, and Marigold Extract.

5. A pet food formulation which is adapted for hound dogs that comprises the following ingredients: Chicken, Ground Rice, Rolled Oats, Chicken Meal, Cracked Pearled Barley, Natural Flavor, Canola Oil Preserved with Mixed Tocopherols, Rosemary Extract and Citric Acid, Tomato Pomace, Brewers Dried Yeast, Chicory Root Extract, Bone Phosphate, Potassium Chloride, Vitamins comprising Choline Chloride, Vitamin A Supplement, Vitamin $D_3$ Supplement, Vitamin E Supplement, Inositol, Niacin, Ascorbic Acid or a Source of Vitamin C, d-Calcium Pantothenate, Thiamine Mononitrate, Riboflavin Supplement, Beta Carotene, Pyridoxine Hydrochloride or Vitamin $B_6$, Folic Acid, Menadione Sodium Bisulfite Complex or a Source of Vitamin K activity, and Biotin, Vitamin $B_{12}$ Supplement, Salmon Oil, Evening Primrose Oil, Minerals comprising Zinc Oxide, Zinc Proteinate, Ferrous Sulfate, Iron Proteinate, Manganous Oxide, Copper Sulfate, Copper Proteinate, Calcium Iodate, and Sodium Selenite, Potassium Citrate, *Lactobacillus acidophilus, Entercococcus faecium, Bacillus subtilis* Fermentation Extract, *Aspergillus oryzae* Fermentation Extract, *Aspergillus niger* Fermentation Extract Ginkgo Biloba Extract, *Yucca schidigera* Extract, Garlic Powder, Panax Ginseng Root Powder, Chinese Ginseng Root, Spearmint Leaf Powder, Eyebright Powder, Cranberry Juice Concentrate, Siberian Ginseng Extract, Parsley Seed Oil Powder, Glutamine, Ginger Extract, Bromelain, and Marigold Extract.

6. A pet food formulation which is adapted for herding dogs that comprises the following ingredients: Chicken, Ground Rice, Rolled Oats, Chicken Meal, Cracked Pearled Barley, Natural Flavor, Canola Oil Preserved with Mixed Tocopherols, Rosemary Extract and Citric Acid, Tomato Pomace, Brewers Dried Yeast, Chicory Root Extract, Bone Phosphate, Potassium Chloride, Vitamins comprising Choline Chloride, Vitamin A Supplement, Vitamin $D_3$ Supplement, Vitamin E Supplement, Inositol, Niacin, Ascorbic Acid or a Source of Vitamin C, d-Calcium Pantothenate, Thiamine Mononitrate, Riboflavin Supplement, Beta Carotene, Pyridoxine Hydrochloride or Vitamin $B_6$, Folic Acid, Menadione Sodium Bisulfite Complex or a Source of Vitamin K activity, and Biotin, Vitamin $B_{12}$ Supplement, Salmon Oil, Evening Primrose Oil, Minerals comprising Zinc Oxide, Zinc Proteinate, Ferrous Sulfate, Iron Proteinate, Manganous Oxide, Copper Sulfate, Copper Proteinate, Calcium Iodate, and Sodium Selenite, Potassium Citrate, *Lactobacillus acidophilus, Entercococcus faecium, Bacillus subtilis* Fermentation Extract, *Aspergillus oryzae* Fermentation Extract, *Aspergillus niger* Fermentation Extract, Glucosamine Hydrochloride, Ginkgo Biloba Extract, *Yucca schidigera* Extract, Panax Ginseng Root Powder, Spearmint Leaf Powder, Eyebright Powder, Siberian Ginseng Extract, Chinese Ginseng Root, Parsley Seed Oil Powder, Ginger Extract, Glutamine, Bromelain, and Marigold Extract.

7. A pet food formulation that is adapted for sporting dogs that comprises the following ingredients: Chicken, Ground Rice, Chicken Meal, Natural Flavor, Canola Oil Preserved with Mixed Tocopherols, Rosemary Extract and Citric Acid, Tomato Pomace, Brewers Dried Yeast, Chicory Root Extract, Potassium Chloride, Sodium Bicarbonate, Vitamins comprising Choline Chloride, Vitamin A Supplement, Vitamin $D_3$ Supplement, Vitamin E Supplement, Inositol, Niacin, Ascorbic Acid or a Source of Vitamin C, d-Calcium Pantothenate, Thiamine Mononitrate, Riboflavin Supplement, Beta Carotene, Pyridoxine Hydrochloride or Vitamin $B_6$, Folic Acid, Menadione Sodium Bisulfite Complex or a Source of Vitamin K activity, and Biotin, Vitamin $B_{12}$ Supplement, Salmon Oil, Evening Primrose Oil, Minerals comprising Zinc Oxide, Zinc Proteinate, Ferrous Sulfate, Iron Proteinate, Manganous Oxide, Copper Sulfate, Copper Proteinate, Calcium Iodate, and Sodium Selenite, Glucosamine Hydrochloride, Hawthorn Berry Powder, Ginkgo Biloba Extract, *Yucca schidigera* Extract, Taurine, Panax Ginseng Root Powder, Chinese Ginseng Root, Spearmint Leaf Powder, Eyebright Powder, Siberian Ginseng Extract, Parsley Seed Oil Powder, Ginger Extract, Glutamine, and Marigold Extract.

* * * * *